(12) United States Patent
Kuchuk-Yatsenko et al.

(10) Patent No.: US 6,211,489 B1
(45) Date of Patent: *Apr. 3, 2001

(54) METHOD OF MAGNETICALLY IMPELLED ARC BUTT WELDING

(75) Inventors: Sergei Ivanovich Kuchuk-Yatsenko; Vadim Yurjevich Ignatenko; Vladimir Stanislavovich Kachinskii; Mikhail Pavlovich Koval, all of Kyiv (UA)

(73) Assignee: E.O. Paton Electric Welding Institute of the National Academy of Sciences of Ukraine, Kyiv (UA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,701

(22) Filed: Jan. 21, 1999

(30) Foreign Application Priority Data

Jan. 21, 1998 (UA) ..................... 29911

(51) Int. Cl.$^7$ ................................. B23K 9/08
(52) U.S. Cl. ........................... 219/123; 219/61
(58) Field of Search ............... 219/123, 60 R, 219/60 A, 61

(56) References Cited

U.S. PATENT DOCUMENTS 5,117,084 * 5/1992 Kuchuk-Yatsenko et al. ...... 219/123

\* cited by examiner

*Primary Examiner*—Clifford C. Shaw
(74) *Attorney, Agent, or Firm*—Jacobson, Price, Holman & Stern, PLLC

(57) ABSTRACT

A press welding process which can be used in such industries as car-making, production of hot-water boilers, industrial and civil construction, in construction of pipelines using small and medium diameter pipes, for welding parts with a solid and developed cross-section, as well as for joining parts to form a T-joint. A magnetically impelled arc butt welding is achieved, that, during heating, the controlled continuous displacement of the parts being welded is performed where the gap between the parts edges is kept constant. The value of the welding arc voltage is used as the parameter for the gap size adjustment, and the moment of achievement of the required temperature on the edges of parts being welded, is determined by the length of the relative displacement of the parts, and when the assigned values of displacement have been reached, the speed of the arc movement along the edges of the parts being welded, is programmed. An improved quality of the welded joints produced by magnetically impelled arc butt welding is obtained.

1 Claim, 1 Drawing Sheet

METHOD OF MAGNETICALLY IMPELLED ARC BUTT WELDING

The proposed method belongs to press welding processes in which the source of heating of the parts being welded is the magnetically impelled welding arc, and it can be applied in such industries as car-making, boiler-construction, building industry, in the construction of pipelines, for joining parts of the tubular and solid cross-section, as well as for parts joining to form a tee-joint.

Known is the process of welding by the magnetically impelled arc, in which the sound frequency signals are used in order to improve the quality of the produced joints, the signals being generated during the arc displacement along the edges of parts being welded. The sound frequency and volume change during arcing, the signal of mismatch between the values of these parameters and the preset ones, is the criterion for controlling the current, voltage and size of the gap between the edges of parts being welded (GDR, "Schweisstechnik", #6, 1980).

The disadvantage of this method is the complexity of the control system, low repeatability of the process because of the acoustic properties of the instrumentation and premises in which the equipment is operated.

Also known is the method of controlling the welding process by the energy Input into the item edges (ZIS -Mitteilungen #10, 1982, pages 1051–1055). The essence of the process is as follows. The converted signals of voltage and current during heating arrive to the computer where the power evolved in the edges of parts being welded, is calculated. The readings are taken every 0.1 s. During heating the derived power values reduced to the thermal energy evolved on the edges, are accumulated. The accumulated energy equivalent is analyzed by the computer, and, as the calculated value is reached, it serves as a parameter for controlling the process of heating. The control system analyzes the correspondence between the accumulated energy and the reference value derived through calculations. In the case of deviation of the accumulated energy value by more than 10% from the reference one, the joint is rejected.

The disadvantage of this control process is the fact that during the edges heating, neither the voltage, nor the current remain constant, their value depends on the arc position relative to the cross-section of the edges of items being welded. It is experimentally established that the arc voltage varies during the entire welding cycle and that this change has a characteristic dependence.

During laboratory studies, it was found that at the initial moment of the arc displacement along the items edges, it shifts from the outer edge of the section (for tubular items) to the inner one. Here, the arc voltage deviations can reach 20% of the initial value, which is established at the moment of the start of the stable arc movement along the item edges. It was also established that the quality of the produced joints is largely dependent on the arc position during heating relative to the section of the item being welded. Thus, with the same energy spent to achieve the plastic state, the quality of the produced joints can have vary considerably.

Taken as the prototype of the claimed invention, is the process of magnetically impelled arc butt welding in which the parts to be welded, are heated. Here, the moment of achievement of the required heating temperature on the edges of the parts being welded, is determined, and then the welding current is increased, and upsetting is performed (USSR A.C. # 1692785 V23 K 9/08 of 23.12.87. Authors: S. I. Kuchuk-Yatsenko, V. Yu. Ignatenko, et al., publ. 23.11.91. Bul. #43). According to this method, the moment of achievement of the plastic state by the edges of items being welded, is determined by the value of welding arc voltage. The nature of arc voltage variation during heating was experimentally determined (V. D. Taran, Yu. G. Gagen, M. Mashinostrojenie, 1970, "Magnetically impelled arc welding"). The process taken as the prototype, is implemented as follows:

The process is based on the principle of thermal expansion which leads to the arc gap narrowing. The minimal arc voltage corresponding to the start of part edges melting, is determined experimentally with the same gap between the parts being welded. When during heating, the minimal arc voltage is reached, which corresponds to achievement of the plastic state of the items edges, the welding current is increased (boosting) and upsetting is performed (pressing together of the items being welded).

The disadvantage of this welding process is the low stability of the process of arc displacement, which is especially important at the final heating stage prior to upsetting for production of sound joints. Furthermore, the nature of arc displacement, and, therefore, the heating stability, are greatly influenced by the condition of the edges of items being welded (presence of skewing, rust, etc.). Note also the limited applicability of the process for welding tubular parts with more than 5 mm wall thickness, because of thermal expansion and shorting of the arc gap during heating.

The invention is aimed at improvement of the process of magnetically impelled arc butt welding, by controlling the displacement of the parts being welded during heating and monitoring the size of the gap between their edges, thus providing the constant value of welding voltage during welding, and, thereby, improving the stability of the welding arc displacement along the items edges, allowing the arc gap between the edges of the items being welded to be kept constant, and thus eliminating the influence of the condition of their edges, as well as preventing the short-circuiting between the edges of the parts being welded at their thermal expansion during heating, thereby providing the capability of welding the tubular parts with more than 5 mm wall thickness. The essence of the invention consists in that the process of magnetically impelled arc butt welding, in which the parts being welded are heated, with determination of the moment of achievement of the required heating temperature on the edges of the parts being heated, then the welding current is increased and upsetting is performed, according to the invention during heating the controlled continuous displacement of the parts being welded is carried out, here the gap between the edges of the parts is kept constant, the welding arc voltage being used as the parameter for the gap size adjustment, and the moment of achievement of the required heating temperature on the edges of parts being welded, is determined by the value of relative displacement of the parts, and when the preset displacement values have been achieved, the speed of the arc movement along the edges of parts being welded, is programmed.

It is found that at the start of the heating process, the arc voltage rises with the speed of the arc displacement. After some time, the voltage starts decreasing, and keeps dropping until the start of melting of the edges of parts being welded. The nature of the arc voltage variation is identical for various materials and is determined by the share of thermal energy consumed in the items heating. The nature of voltage variation during heating depends on the physical and structural characteristics of the material (cross-sectional area, linear thermal expansion factor, etc.).

Figure 1:
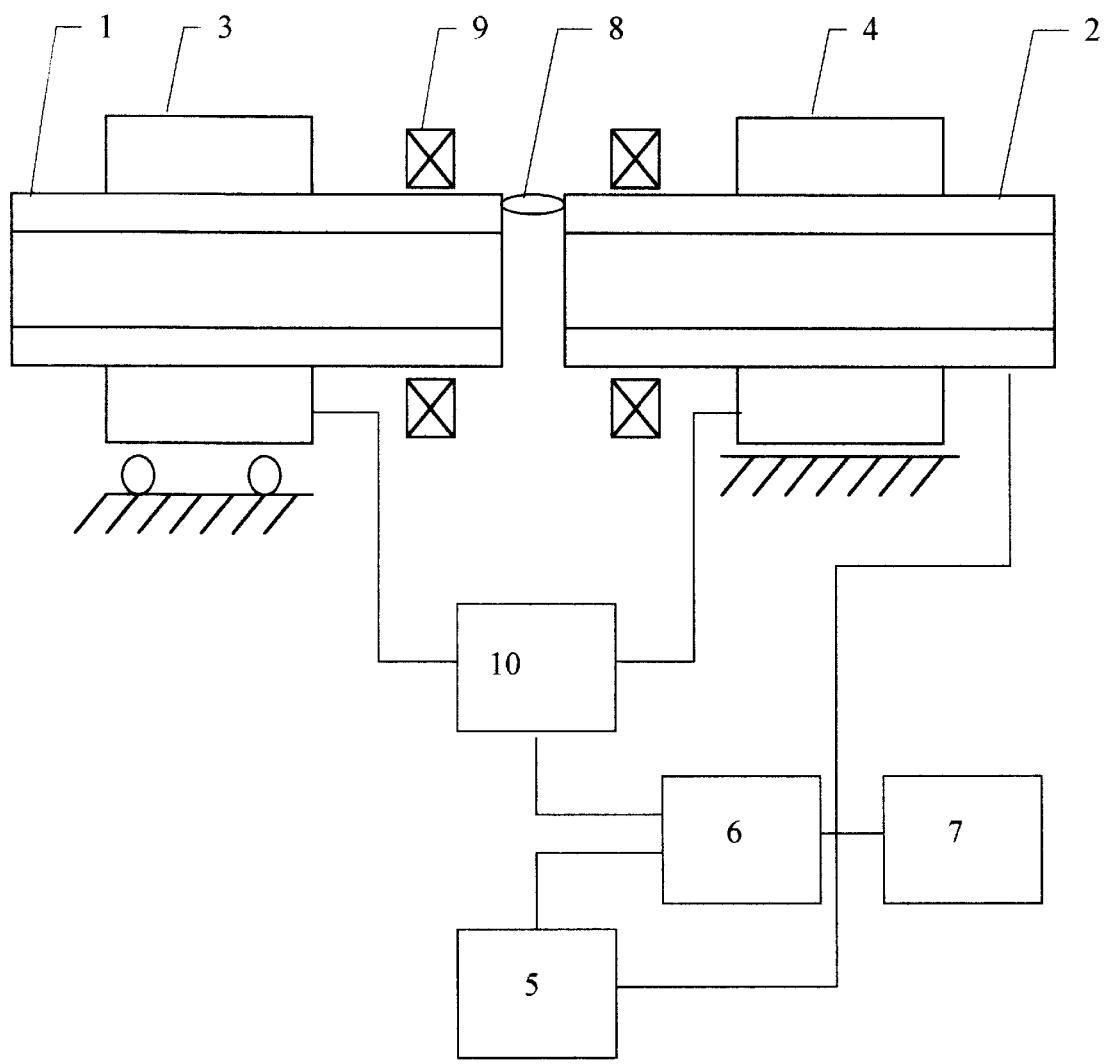
FIG. 1 shows an arrangement for pressure welding two parts with a magnetically impelled arc according to the invention.

A device, the block diagram of which is given in FIG. 1, was manufactured for implementation of the proposed process.

The designations in FIG. 1 are as follows:
1, 2—parts being welded;
3—mobile clamping device;
4—stationary clamping device;
5—arc voltage measurement block;
6—electrohydraulic amplifier power amplifier;
7—electrohydraulic amplifier module;
8—welding arc;
9—magnetic system;
10—displacement sensor block.

The process is implemented in the following manner. First, items 1, 2 are placed without a gap into the clamping devices 3, 4 of the welding machine. At the moment the welding current flows, arc voltage measurement block 5 generates a signal for controlling the displacement of the mobile part 3 of the machine. Displacement control is performed by interaction of blocks 6 and 7. The displacement direction in the initial phase of the process, is determined as follows. If the short-circuiting mode is in place at the moment the welding current flows, mobile part 3 of the machine moves backwards up to establishment of arcing mode 8, until the arc voltage becomes equal to the reference value preset in block 5. In the case if the open-circuit mode is in place when the welding current is supplied, forward movement is executed up to short-circuiting. The speed of movement of mobile part 3, is determined by the level of the signal of mismatch between arc voltage 8 and the reference value. This method of controlling the welding arc excitation ensures 100% stable initial phase of the welding process.

After excitation, the welding arc starts moving along the edges of the parts being welded under the action of the magnetomotive force created by magnetic system 9. After the time equal to 1–2.5 s the arc movement changes from the acceleration phase to the phase of stable movement along the parts edges.

At the start of this stage, displacement sensor block 10 measures the value of displacement of the machine mobile part relative to the initial position (moment of arc excitation). The derived value is stored in the displacement sensor block 10.

As the edges of the items being welded are heated, block 5 monitors and maintains a constant arc voltage within 1 to 5% of the reference value. The quick response of system 6, 7 of arc voltage measurement and control of displacement of mobile part, allows monitoring and correction of disturbances of less than 0.2 s duration, thus promoting a stable movement of the arc.

According to the invention described in the prototype, the arc gap is reduced through thermal expansion with the parts heating. In the proposed engineering solution, it is maintained constant by continuous displacement of mobile part 3 of the machine, in keeping with the value and sign of the mismatch signal, this being especially important at the final stage of heating, when at the moment of achievement of the required temperature of heating of the items being welded, shorting of the arc gap starts through thermal expansion, especially in welding the tubular items with more than 5 mm wall thickness.

At the moment determined by the extent of thermal expansion of the items, and by the relative displacement of mobile part 3 of the machine, respectively, based on the length of displacement determined by the displacement sensor block 10, an abrupt increase of welding current (boosting) takes place, accompanied by intensive splashing of molten metal from the gap between the parts being welded, thus resulting in an abrupt widening of the arc gap, at the moment when the total shortening of the parts amounts to 0.5 to 4.5 mm (this value depends on the typesizes and material of the items and is controlled by the displacement sensor block 10 of the machine mobile part 3), upsetting is performed and after 0.1 to 0.3 s the welding current is switched off.

A example of the process implementation.

The parts to be welded, in this case steel 20 pipes of 42 mm diameter and 4 mm wall thickness, were mounted without a gap in the clamping devices of the laboratory unit. At the moment of the welding current supply, mobile clamp moved backwards forming a gap between the parts being welded, in which the voltage of the excited welding arc was up to 24 V. Under the impact of the magnetomotive force induced by the magnetic system, the arc started moving along the edges of the pipes being welded. For stabilization of the arc displacement at the initial stage of welding, the unit mobile clamp moved in keeping with the value of the monitored welding arc voltage.

The position of the mobile clamp at the moment of stabilization of the arc displacement along the edges of the parts, was monitored by the displacement sensor and was the basis for measurement of the relative displacement of the mobile clamp during heating. When during heating, the relative displacement value of 0.8 mm had been reached through thermal expansion of pipes, the control block issued a command for an abrupt increase of the welding current (boosting). The mobile clamp position measured at this moment by the displacement sensor, was the basis for determination of the moment of upsetting start. During boosting, when the total shortening of the parts being welded, was equal to 2.5 mm because of intensive splashing of the molten metal from the arc displacement zone, a command was issued for the parts pressing together (upsetting). After the time equal to 0.3 s, the welding current was switched off.

This completed the welding process. The control circuit monitored the unclamping of the welded parts and opening of the clamps. The extent of shortening of the welded parts was 6 mm. The parts upsetting was performed at the speed of not less than 150 mm/s with 25,000 N force. The total welding time was 10 s.

Testing of welded samples of parts was conducted to the current codes and regulations.

Analysis of the welded joints of pipes made using the prototype and the proposed process showed the quality of the joints performed by the above process to be higher.

Improvement of the quality of joints was achieved by a more precise determination of the moment when the edges of parts being welded, reached the plastic state, and a greater stability of the process of the arc displacement, especially at the final stage of heating, prior to boosting.

The proposed process has the following advantages compared to the prototype:
1. High stability of the process in the initial phase (arc excitation).
2. Stable uniform heating of the items edges across the entire cross-sectional area.
3. High accuracy of determination of the moment of the edges reaching the plastic state.
4. Stable displacement of the arc.
5. High accuracy of determination of the moment of upsetting start.
6. Low requirements to preparation of the edges of parts being welded (rust and skewing of up to 1.5 mm are allowed).

7. A broader range of items welded due to the capability of welding parts with a larger cross-sectional area.

What is claimed is:

1. A method of pressure welding with heating by a magnetically-impelled arc during which parts to be welded are heated, while a moment of achievement of a required heating temperature at end faces of the parts being welded is determined, said method comprising:

heating of the parts being welded, setting a reference value of voltage of the arc between the end faces of the parts being welded, the reference value corresponding to an optimal arc gap, and measuring arc voltage during welding and in a case of a discrepancy between the arc voltage and the reference value of voltage, moving one of the parts during welding depending on a mismatch value and sign to maintain the reference value of voltage and the optimal arc gap and a moment of achievement of the required heating temperature on the end faces of the parts being welded is determined by achievement of a specified value of movement of one of the parts during welding relative to the other part being welded so as to maintain the reference value of voltage constant during welding.

* * * * *